United States Patent
Bai et al.

(10) Patent No.: US 12,340,565 B2
(45) Date of Patent: Jun. 24, 2025

(54) VALIDATION OF UNSUPERVISED ADAPTIVE MODELS

(71) Applicant: Lemon Inc., Grand Cayman (KY)

(72) Inventors: Song Bai, Singapore (SG); Dapeng Hu, Singapore (SG); Jun Hao Liew, Singapore (SG); Chuhui Xue, Singapore (SG)

(73) Assignee: LEMON INC., Grand Cayman (KY)

( * ) Notice: Subject to any disclaimer, the term of this patent is extended or adjusted under 35 U.S.C. 154(b) by 395 days.

(21) Appl. No.: 18/070,318

(22) Filed: Nov. 28, 2022

(65) Prior Publication Data
US 2024/0177460 A1  May 30, 2024

(51) Int. Cl.
*G06V 10/00* (2022.01)
*G06V 10/774* (2022.01)
*G06V 10/776* (2022.01)

(52) U.S. Cl.
CPC .......... *G06V 10/774* (2022.01); *G06V 10/776* (2022.01)

(58) Field of Classification Search
CPC ........ G06N 20/00; G06N 20/20; G06V 10/82; G06V 10/774; G06V 10/776; G06F 18/217; G06F 18/2155; G06F 18/2415
See application file for complete search history.

(56) References Cited

U.S. PATENT DOCUMENTS

| | | | | |
|---|---|---|---|---|
| 6,795,794 | B2* | 9/2004 | Anastasio | G06N 3/02 |
| | | | | 702/181 |
| 7,813,926 | B2* | 10/2010 | Wang | G10L 15/063 |
| | | | | 704/243 |
| 9,015,092 | B2* | 4/2015 | Sinyavskiy | G06N 3/08 |
| | | | | 706/25 |
| 10,347,271 | B2* | 7/2019 | Nesta | G10L 25/30 |
| 10,769,532 | B2* | 9/2020 | Dang | G06N 3/045 |
| 11,144,579 | B2* | 10/2021 | Bull | G06F 16/3347 |
| 11,200,883 | B2* | 12/2021 | Li | G10L 15/10 |
| 11,537,901 | B2 | 12/2022 | Song et al. | |
| 11,636,348 | B1* | 4/2023 | Tang | G06N 7/01 |
| | | | | 706/16 |
| 11,714,880 | B1* | 8/2023 | Marsden | G06V 20/64 |
| 12,020,436 | B2* | 6/2024 | Yuan | G06T 7/143 |
| 2008/0050047 | A1* | 2/2008 | Bashyam | H03M 7/40 |
| | | | | 382/305 |
| 2021/0133585 | A1 | 5/2021 | Lee et al. | |
| 2022/0108134 | A1 | 4/2022 | Marrero et al. | |
| 2024/0177460 | A1* | 5/2024 | Bai | G06V 10/776 |

* cited by examiner

*Primary Examiner* — Amir Alavi
(74) *Attorney, Agent, or Firm* — Astute IP Law Group

(57) ABSTRACT

Embodiments of the present disclosure relate to validation of unsupervised adaptive models. According to example embodiments of the present disclosure, unlike methods validating with the seen target data, the present disclosure synthesizes new samples by mixing the target samples and pseudo labels. The accuracy between model predictions of mixed samples and the mixed labels are measured for model selection, and the accuracy score may be called PseudoMix. PseudoMix enjoys the combined inductive bias of previous methods. Experiments demonstrate that PseudoMix can keep state-of-the-art performance across different validation settings.

18 Claims, 4 Drawing Sheets

VALIDATION OF UNSUPERVISED ADAPTIVE MODELS

BACKGROUND

Machine learning models, especially deep neural networks, have been used in artificial intelligence (AI) and computer vision fields. These models have shown promising performance in many tasks including prediction, recommendation, visual object recognition, natural language processing (NLP), and so on.

Despite the impressive success of supervised deep learning, deep neural networks (DNN) have difficulty in generalizing to out-of-distribution data. As an effective solution to the out-of-domain generalization obstacle, unsupervised domain adaptation (UDA) can transfer the knowledge from a labeled source domain to a related but unlabeled target domain, to provide so called UDA models. It is also desired to assess performance of UDA models.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, where.

DETAILED DESCRIPTION

Figure 1:
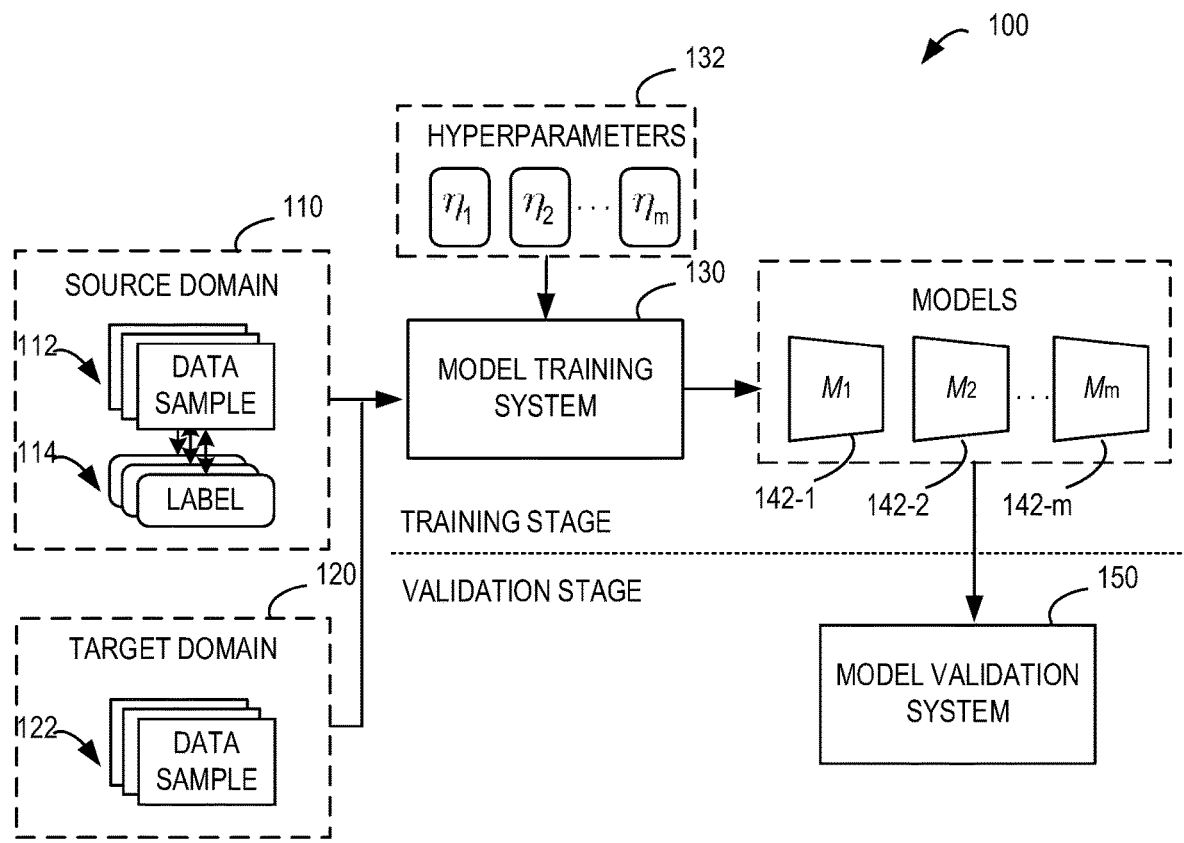
FIG. 1 illustrates a block diagram of an environment for unsupervised domain adaptation in which the embodiments of the present disclosure can be implemented.

Principle of the present disclosure will now be described with reference to some embodiments. It is to be understood that these embodiments are described only for purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for purpose of describing particular embodiments only and is not intended to be limiting example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "model" is referred to as an association between an input and an output learned from training data, and thus a corresponding output may be generated for a given input after the training. The generation of the model may be based on a machine learning technique. The machine learning techniques may also be referred to as artificial intelligence (AI) techniques. In general, a machine learning model can be built, which receives input information and makes predictions based on the input information. For example, a classification model may predict a class of the input information among a predetermined set of classes. As used herein, "model" may also be referred to as "machine learning model", "learning model", "machine learning network", or "learning network," which are used interchangeably herein.

Generally, machine learning may usually involve three stages, i.e., a training stage, a validation stage, and an application stage (also referred to as an inference stage). At the training stage, a given machine learning model may be trained (or optimized) iteratively using a great amount of training data until the model can obtain, from the training data, consistent inference similar to those that human intelligence can make. During the training, a set of parameter values of the model is iteratively updated until a training objective is reached. Through the training process, the machine learning model may be regarded as being capable of learning the association between the input and the output (also referred to an input-output mapping) from the training data. At the validation stage, a validation input is applied to the trained machine learning model to test whether the model can provide a correct output, so as to determine the performance of the model. Generally, the validation stage may be considered as a step in a training process, or sometimes may be omitted. At the application stage, the resulting machine learning model may be used to process a real-world model input based on the set of parameter values obtained from the training process and to determine the corresponding model output.

FIG. 1 illustrates a block diagram of an environment 100 for unsupervised domain adaptation (UDA) in which the embodiments of the present disclosure can be implemented.

At a training stage in the environment 100, a model training system 130 is configured to train one or more models according to a UDA method. As mentioned above, UDA aims to transfer the knowledge from a labeled source domain to a related but unlabeled target domain. As shown in FIG. 1, UDA is based on a source domain 110 with data samples 112 and associated labels 114, and a target domain 120 with data samples 122. In the source domain 110, a label 114 indicates a ground-truth prediction output for a corresponding data sample 112. The data samples 122 in the target domain are not labeled. Therefore, during the training process, a model can learn supervised information from the source domain 110 but has no supervised information in the target domain 120.

As used herein, a "domain" can be either a modality or a dataset. The source and target domains are typically related but not identical. For example, for image types of data, different domains may include sketches, paintings, digital images, or the like, which can vary in appearance from one to another. For text types of data, different domains may include invoices, emails, reports, forms, or the like.

Herein, a model trained according to UDA may be referred to as an unsupervised domain adaptation model, or a domain adaptive model for short. In FIG. 1, the model training system 130 may provide one or more domain adaptive models 142-1, 142-2, . . . , 142-m, where m is an integer larger than or equal to one. For purpose of discussion, the domain adaptive models 142-1, 142-2, . . . , 142-m are collectively or individually referred to as domain adaptive models 142. By training the domain adaptive models 142 with the labeled source domain and unlabeled target domain, the trained domain adaptive models 142 can be applied for inference in the target domain.

UDA has been widely studied in the computer vision community and applied to various computer vision tasks requiring cross-domain generalization, including image recognition, semantic segmentation, and object detection. Accordingly, the domain adaptive models 142 may be constructed with any machine learning or deep learning architectures to implement the corresponding tasks. The task implemented by the domain adaptive models 142 may be defined depending on practical applications. In operation, a domain adaptive model 142 is configured to process a model input, i.e., a data sample, and generate a model output, i.e., a prediction result.

In a validation stage in the environment 100, a model validation system 150 is configured to validate performance of one or more of the trained domain adaptive models 142.

Most UDA methods have hyperparameters, ranging from training-related settings to loss-related hyperparameters. By utilizing different hyperparameters in a same UDA method, the trained different models may have different performance levels. In FIG. 1, the model training system 130 is configured to perform training according to a set of different hyperparameters 132. It is assumed that the domain adaptive model 142-1 is trained using a hyperparameter(s) represented as $\eta_1$, the domain adaptive model 142-2 is trained using a hyperparameter(s) represented as $\eta_2$, . . . , and the domain adaptive model 142-m is trained using a hyperparameter(s) represented as $\eta_m$.

Lots of attention are attracted to developing various novel UDA methods, including feature level alignment, output-level alignment, output-level regularization, feature-level regularization, and self-training with target data. However, without suitable hyperparameters for model training, a UDA method can under-perform the base-line model without adaptation. Hyperparameter selection is especially significant for the reliable application of UDA algorithms, which, however, is largely overlooked by previous UDA works.

In some embodiments, the model validation system 150 may be configured to assess performance levels of the respective trained domain adaptive models 142, especially in the target domain, so as to select a target domain adaptive model 142 with a target performance level or the hyperparameter utilized for training this target domain adaptive model 142.

For example, in the validation stage, the goal is to select the trained model having the lowest risk (or the highest performance level) on the target domain and select the corresponding hyperparameter for the UDA method. Only labeled source data and unlabeled target data are provided for model selection. The absence of labeled target data closes the door to supervised target validation. On the other hand, under the covariate shift assumption, the source risk evaluated on labeled source data, cannot guarantee the target risk.

UDA has attracted considerable attention due to its ability to enhance model generalization on out-of-domain data. Validation in UDA is significant to ensure a high-performance UDA model trained for the target domain but challenging without labeled data in the target domain. Traditional validation methods require accessing source data and re-training new models to estimate the target risk with the re-weighted source risk or the reversed source validation risk. Recent works show that only using unlabeled target data and measuring some inductive bias of the model can achieve competitive validation performance. Unlike methods validating with the seen target data, the present disclosure synthesizes new samples by mixing the target samples and pseudo labels. The accuracy between model predictions of mixed data samples and the mixed labels are measured, e.g., for model selection or hyperparameter selection. The accuracy level or score may be called PseudoMix. PseudoMix enjoys the combined inductive bias of previous methods. Experiments demonstrate that PseudoMix can keep state-of-the-art performance across different validation settings.

There have been proposed some validation methods for UDA. Following the source data-detaching trend in UDA, those validation methods may be classified into two categories according to whether requiring source data. For the purpose of comparison, some traditional validation methods are briefly introduced below.

For classic UDA, domain adaptive models are trained with both source and target data. Therefore, some validation methods in a first category also use the labeled source data to help the validation in the target domain.

A first validation method is to assess performance levels in the source domain with the labeled source data. Since there are many labeled source data and the UDA model is trained with source and target data, it is natural to estimate the target risk with the source risk. This validation method requires a hold-out validation data set from source data to evaluate the accuracy of trained UDA models. Then the model with the best validation accuracy may be selected.

A second validation method is based on importance-weighted validation risk. For better target risk estimation, it is proposed Importance-Weighted Cross Validation (IWCV) to reweight the source validation risk with a source-target density ratio estimated in the input space. However, the covariate shift between domains poses high risks to input density estimation. Therefore, Deep Embedded Validation (DEV) improved IWCV by estimating the density ratio in the feature space with the help of a domain discriminator and controlling the estimation variance.

A third validation method is based on reverse validation risk. In the training process of UDA models, the roles of the two domains are different. As for source-to-target adaptation model $M^{s2t}$ training, source data are involved in both supervised loss and adaptation loss while target data only show in the latter one. Therefore, directly using source validation risk to estimate the target risk is inaccurate when the covariate shift is heavy. Reverse Validation (RV) proposed to train a symmetric target-to-source adaptation model $M^{t2s}$, under which case, the domain roles are reversed. In this new UDA task, the source domain will become the new "target" domain with enough labeled data for validation. To make the unlabeled target domain satisfy the new role of the "source" domain in the symmetric task, RV uses pseudo labels predicted by the original UDA model $M^{s2t}$ as labels.

However, the above validation methods require accessing labeled source data and training new models, which makes model selection cumbersome. Since the goal of UDA validation is to select the model with the best accuracy on unlabeled target data, a second category of validation methods directly measure the different inductive biases of the trained models according to only target predictions. For each candidate domain adaptive model M, the model predictions $\{p_t^i\}_{i=1}^{n_t}$ can be obtained for unlabeled target data samples $\{x_t^i\}_{i=1}^{n_t}$. For brevity, in classification related tasks, the model predictions may be represented as softmax probability predictions $\{p^i\}_{i=1}^{n_t}$, where $p^i \in \mathcal{R}^K$, and the prediction matrix may be represented as $P \in \mathcal{R}^{n_t \times K}$, where $n_t$ is the number of target data samples and K is the number of categories.

A first validation method in the second category is to adopt the mean Shannon's entropy of target predictions as the validation metric. The motivation behind using entropy is the low-density property of the classifier, i.e., minimizing entropy in training will favor putting the decision boundary in a low-density region. The mean entropy metric is:

$$\text{Entropy} = -\frac{1}{n_t}\sum_{i=1}^{n_t}\sum_{j=1}^{K} P_{ij} \log P_{ij}. \quad (1)$$

The model with the lowest Entropy score is believed to have the highest accuracy level in the target domain.

A second validation method is based on mutual information. The Entropy score only considers the property of sample-wise discrimination, which can be misleading when predictions are confident but biasing to a small fraction of categories. As a complement, the input-out mutual information maximization (InfoMax) adds another global diversity term over the Entropy score. InfoMax encourages locally discriminative but globally diversified predictions. The InfoMax score is determined as follows and used as a validation metric:

$$\text{InfoMax} = -\sum_{j=i}^{K} \overline{p} \log \overline{p} - \frac{1}{n_t}\sum_{i=1}^{n_t}\sum_{j=1}^{K} P_{ij} \log P_{ij}, \quad (2)$$

where $$\overline{p} = \frac{1}{n_t}\sum_{i=1}^{n_t} P_{ij}, \quad \overline{p} \in \mathcal{R}^K$$

is the mean prediction. The model with the highest InfoMax score is believed to have the highest accuracy level in the target domain.

A third validation method is to measure the neighborhood consistency in the feature to determine a new validation metric called Soft Neighborhood Density (SND). Specifically, SND takes softmax predictions as feature vectors, computes the similarity relationship between samples, and encourages a high mean entropy of the similarity distribution. The SND score can be obtained by:

$$SND = -\frac{1}{n_t}\sum_{i=1}^{n_t}\sum_{j=1}^{n_t} S_{ij} \log S_{ij}, \quad (3)$$

where $S = \text{softmax}(PP^T/\tau)$, $S \in \mathcal{R}^{n_t \times n_t}$ is the similarity matrix and $\tau$ is a small temperature to sharpen the similarity. The model with the highest SND score is believed to have the highest accuracy level in the target domain.

A fourth validation method is based on category correlation. Unlike SND, the correlation matrix between categories is determined to measure class confusion. It is proposed to compute the cosine similarity between the category correlation matrix and an identity matrix, which is called Corr-C. The inner product score is provided as: Corr-I=sum(diag $(P^TP)$). The score of Corr-C can be obtained by:

$$\text{Corr-}C = \frac{\text{sum}(\text{diag}(P^TP))}{\|P^TP\|_F}, \quad (4)$$

The model with the lowest Corr-C or Corr-I score is believed to have the highest accuracy level in the target domain.

It is demonstrated that model validation with only unlabeled target data is more practical and able to outperform methods using source data. However, all these target-only validation methods measure their scores with the exact target data, which has been used by the trained domain adaptive model. The standard independent and identically distribution (I.I.D.) supervised validation pipeline requires a training dataset and a disjoint validation dataset. The model is trained on the training dataset and validated on the unseen validation dataset. The risk of validation on the seen training set is overfitting, leading to the inaccurate selection of hyperparameters. Although UDA methods only leverage the original target data for unsupervised training, performing validation on such data violates the rule of a disjoint validation set used in the supervised validation pipeline.

According to embodiments of the present disclosure, there is proposed an improved solution for validation of domain adaptive models. It aims to develop a simple yet effective validation solution without model re-training and source data. To avoid risks of overfitting in validation and respect the transductive learning setting of UDA, it is proposed to synthesize new target data samples for validation of unsupervised domain adaptive models and perform validation with such samples. A trained domain adaptive model is used to model to infer the pseudo labels for unlabeled target data samples and mix the target data sample pairs and the pseudo label pairs. Therefore, a set of mixed samples with mixed pseudo labels are obtained to assess the model accuracy on such 'labeled' new samples.

Through this solution, new data samples are introduced for model validation, which avoid the risks of overfitting. In addition, both the inductive bias of Entropy and SND are taken into account, i.e., considering both the classifier boundary and neighborhood consistency Some example embodiments of the present disclosure will be described in detail below with reference to the accompanying figures.

Figure 2:
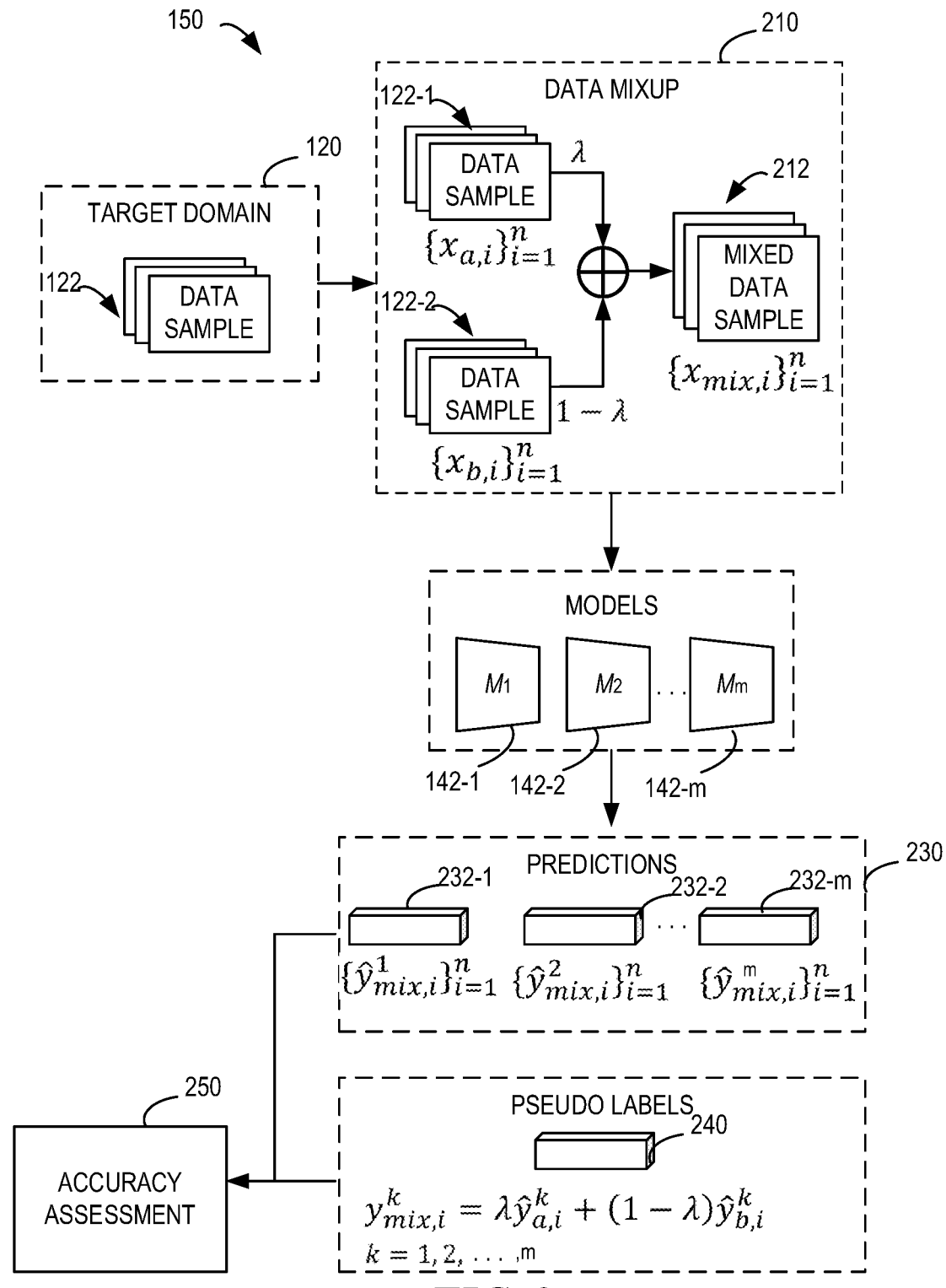
FIG. 2 illustrates a block diagram of a model validation system in accordance with some example embodiments of the present disclosure.

Reference is first made to FIG. 2, which illustrates a block diagram of a model validation system in accordance with some example embodiments of the present disclosure. For purpose of discussion, reference is made with respect to FIG. 1 to discuss the model validation system 150. It is assumed that one or more domain adaptive models 142-1, 142-2, ..., 142-M are trained with a source training dataset in the source domain 110 and a target training dataset in the target domain 120.

As illustrated, the model validation system 150 includes a data mixup sub-system 210 and an accuracy assessment sub-system 250. The model validation system 150 is configured to validate performance of the domain adaptive models 142 based on the target training dataset in the target domain 120. The target training dataset comprises data samples 122 without labels for ground-truth prediction outputs.

Before discussing the model validation, model training based on UDA may be first introduced briefly for better understanding. For purpose of discussion, UDA under the background of a K-way image classification task is introduced as an example, though embodiments of the present disclosure can be applied to any other UDA-based tasks. A labeled source domain is given as $\mathcal{D}_s = \{(x_s^i, y_s^i)\}_{i=1}^{n_s}$ with $n_s$ image samples $x_s$ and the corresponding labels $y_s$, an unlabeled target domain is given as $\mathcal{D}_t = \{x_t^i\}_{i=1}^{n_t}$ with $n_t$ image samples $x_t$. In some cases, $x_s$ and $x_t$ may be provided as image vectors and $y_s$ may be provided as one-hot label encodings with each element corresponding to one category. Under the covariate shift assumption, the input distributions between domains are different, but the conditional distributions of outputs are the same. Therefore, the target domain shares a similar classification task, if not the same, as the source domain. The goal of UDA is to learn a discriminative model M with $\mathcal{D}_s$ and $\mathcal{D}_t$ to predict accurate target labels $\{y_t^i\}_{i=1}^{n_t}$ for $\{x_t^i\}_{i=1}^{n_t}$. For each image vector $x \in \mathcal{R}^d$ in the input space (consisting of the data samples in the source domain and the target domain), the model M outputs a probability prediction vector $p \in R^K$, where $\Sigma_{j=1}^{K} p_j = 1$.

Let $|\mathcal{C}_s| = K$ denote the number of categories of source data, and $|C_t|$ denote the number of categories of target data. When $C_s = C_t$, the source and target domains share the same label space, and this default setting is referred to as closed-set UDA. Similarly, partial-set UDA refers to the setting where target categories are a proper subset of source ones, i.e., $C_s \supset C_t$.

A classic UDA setting requires accessing labeled source data and unlabeled target data simultaneously for effective target adaptation. The general optimization objective is like this:

$$\mathcal{L}_{uda} = \mathcal{L}_{src}(M; \mathcal{D}_s) + \gamma \mathcal{L}_{adapt}(M; \mathcal{D}_s, \mathcal{D}_t, \eta), \quad (5)$$

where $\mathcal{L}_{src}$ usually denotes the cross-entropy loss with only labeled data samples in the source domain and $\mathcal{L}_{adapt}$ is the adaptation loss adapting the source-supervised model M to unlabeled data samples in the target domain. $\gamma$ is a scalar coefficient that belongs to a common type of hyperparameter, and $\eta$ is a vector that denotes other hyperparameters in the adaptation loss.

The source-free unsupervised domain adaptation (SFUDA) has also gained increasing attention. Unlike the classic UDA, SFUDA detaches the source supervised training and unsupervised target adaptation into two sequential stages. SFUDA usually has the following objective function:

$$\mathcal{L}_{sfuda} = \mathcal{L}_{adapt}(M; M_s, \mathcal{D}_t, \eta), \quad (6)$$

where $M_s$ is the trained model provided by the source domain. In the target adaptation stage, a target domain adaptive model M is learned with the source model $M_s$ and unlabeled target data $\{x_t^i\}_{i=1}^{n_t}$. Similarly, $\eta$ denotes possible hyperparameters.

In embodiments of the present disclosure, the domain adaptive models 142 may be trained according to any suitable UDA methods, either currently known or to be developed in the future. In some embodiments, different (e.g., m) domain adaptive models 142 may be trained according to the same UDA method by setting (e.g., m) different values of the hyperparameters used in the UDA method. The hyperparameters to be set in different UDA methods may also be different. In some embodiments, more than one hyperparameter may be set in UDA. Some examples of hyperparameters in some example UDA methods known currently are provided in following Table 1. It would be appreciated that other UDA methods and/or other hyperparameters may also be considered in the embodiments of the present disclosure.

TABLE 1

Summary of example UDA methods and hyperparameters

| UDA method | UDA Type | Hyperparameter | Search Space | Default Value |
|---|---|---|---|---|
| ATDOC | closed-set self-training | loss coefficient $\lambda$ | {0.02, 0.05, 0.1, 0.2, 0.5, 1.0, 2.0} | 0.1 |
| BNM | closed-set output regularization | loss coefficient $\lambda$ | {0.02, 0.05, 0.1, 0.2, 0.5, 1.0, 2.0} | 1.0 |
| CDAN | closed-set feature alignment | loss coefficient $\lambda$ | {0.05, 0.1, 0.2, 0.5, 1.0, 2.0, 5.0} | 1.0 |
| MCC | closed-set output regularization | temperature T | {1.0, 1.5, 2.0, 2.5, 3.0, 3.5, 4.0} | 2.5 |
| MDD | closed-set output alignment | margin factor $\gamma$ | {0.5, 1.0, 2.0, 3.0, 4.0, 5.0, 6.0} | 4.0 |
| SAFN | closed/partial-set feature regularization | loss coefficient $\lambda$ | {0.002, 0.005, 0.01, 0.02, 0.05, 0.1, 0.2} | 0.005 |
| PADA | closed-set feature alignment | loss coefficient $\lambda$ | {0.05, 0.1, 0.2, 0.5, 1.0, 2.0, 5.0} | 1.0 |
| SHOT | source-free hypothesis transfer | loss coefficient $\beta$ | {0.03, 0.05, 0.1, 0.3, 0.5, 1.0, 3.0} | 0.3 |

The validation problem in UDA aims to validate performance, e.g., an accuracy level of a trained domain adaptive model M. Through validation, it is possible to select a model M with the most accurate label predictions for the target domain $\mathcal{D}_t$ among a plurality of trained domain adaptive models $\{M_i\}_{i=1}^m$ trained with m different values of hyper-parameters $\{\eta_i\}_{i=1}^m$. The challenge of UDA validation mainly arises from the absence of labeled data in the target domain. On the other hand, the covariate shift poses high risks of source bias to directly using labeled source data for target domain validation.

At the validation stage according to embodiments of the present disclosure, the data mixup sub-system 210 is configured to generate a new data sample in the target domain by combining each pair of data samples 122 in the target domain 120. There are various ways of generating new target samples, including generative training, data augmentation, and data mixture. In some embodiments of the present disclosure, the data mixup sub-system 210 is configured to use mixup for new sample synthesis because of its simplicity and convex property. Specifically, the data mixup sub-system 210 is configured to generate a mixed data sample for the target domain by combining a pair of data samples 122 in the target domain 120. In some examples, a number of mixed data samples may be generated by combing different pairs of data samples 122.

In some embodiments, the mixed data sample may be a convex combination of the pair of data samples 122. The mixed data sample 212 $x_{mix}$ may be generated by weighting a first data sample 122-1 $\{x_{a,i}\}_{i=1}^n$ with a first weight and a second data sample 122-2 $\{x_{b,i}\}_{i=1}^n$ with a second weight to obtain a weighted combination of the pair of data samples, as follows:

$$x_{mix} = \lambda * x_a + (1-\lambda) * x_b, \qquad (7)$$

where $\lambda$ is a scalar, denoting the weight or coefficient for mixup, x denotes a data sample 122 in the target domain 120. In some examples, $x_a$ and $x_b$ may be randomly selected from the target training dataset in the target domain 120. Through the data mixup, a mixed dataset $\{x_{mix,i}\}_{i=1}^n$ may be obtained, where n represents the number of mixed data samples, which may be equal to the number of data samples 122 in the target training dataset. In some examples, depending on the number of data samples required for model validations, the number of mixed data samples may be varied, e.g., may not be equal to the number of data samples 122.

In some embodiments, for the image mixup, random data samples 122 as a pair may be convexly combined to obtain the mixed dataset. In some embodiments, for mixup of other types of data such as text, video, and audio, corresponding mixup methods may be applied. For example, for the text type, text data samples may be converted into embeddings for mixup. For the video type, the image mixup may be applied for respective frames in video clips. For the audio type, the mixup may be performed on the corresponding waveform signals.

To perform the validation, labels for the new mixed data sample $x_{mix}$ are needed. The labels may generally be generated in a similar way as the mixup of the data samples as follows:

$$y_{mix} = \lambda * y_a + (1-\lambda) * y_b, \qquad (8)$$

where $\lambda$ is the same weight or coefficient for data mixup, y denotes a ground-truth label for a corresponding data sample 122. Since the ground-truth labels $\{y_t^i\}_{i=1}^n$ for the target training dataset in the target domain are absent in UDA, in embodiments of the present disclosure, it is proposed to combine prediction outputs provided by a domain adaptive model 142 for a pair of data samples 122, to generate a pseudo label for a mixed data sample generated from the pair of data samples.

Accordingly, prediction outputs for the data samples 122 in the target domain 122 are generated by applying the respective data samples 122 into a domain adaptive model 142. With respect to a domain adaptive model 142 and a mixed data sample 212 generated from a data sample 122-1 $x_{a,i}$ and a data sample 122-2 $x_{b,i}$, a pseudo label 240 for this mixed data sample 212 used to validate this domain adaptive model 142 may be generated as follows:

$$y_{mix,i}^k = \lambda \hat{y}_{a,i}^k + (1-\lambda)\hat{y}_{b,i}^k, \qquad (9)$$

where k represents the k-th domain adaptive model 142 and k=1, 2, ..., m; $y_{mix,i}^k$ represents a pseudo label for the i-th mixed data sample for the k-th domain adaptive model 142; $\hat{y}_{a,i}^k$ represents a prediction output by the k-th domain adaptive model 142 for the data sample $x_{a,i}$; and $\hat{y}_{b,i}^k$ represents a prediction output by the k-th domain adaptive model 142 for the data sample $x_{b,i}$. Therefore, new data samples in the target domain 122 and the corresponding pseudo labels may be obtained, represented as $\mathcal{D}_{mix} ::: \{(x_{mix}^i, y_{mix}^i)\}_{i=1}^n$.

In some embodiments, the weight $\lambda$ used for generating the mixed data samples and the pseudo labels may be set to close to 0.5 (e.g., 0.51, 0.509, 0.52, 0.49, etc.), which makes the synthesized samples lie between two target clusters though still slightly biased to one side. In this way, it would lie high challenging for the domain adaptive model 142 to accurately classify the mixed data samples. Thus, the validation results will be more reliable. It would be appreciated that although the same weight $\lambda$ are used in the above examples, the weight for data mixup and label mixup may be varied for mixing up different pairs of data samples 122, as long as the same weights are used to generate the pseudo labels.

Further, the mixed data samples 212 $\{x_{mix,i}\}_{i=1}^n$ are applied as respective inputs into the domain adaptive models 142, respectively, to determine respective predictions 230. For the m trained domain adaptive model 142-1, 142-2, ..., 142-m, corresponding prediction outputs 232-1 $\{\hat{y}_{mix,i}^1\}_{i=1}^n$, prediction outputs 232-2 $\{\hat{y}_{mix,i}^2\}_{i=1}^n$, ..., prediction outputs 232-m $\{\hat{y}_{mix,i}^m\}_{i=1}^n$ may be obtained for the mixed data samples 212 $\{x_{mix,i}\}_{i=1}^n$. The prediction outputs 232-1, 232-2, ..., 232-m for the domain adaptive model 142-1, 142-2, ..., 142-m may be collectively or individually referred to as prediction outputs 232.

The accuracy assessment sub-system 250 can determine an accuracy level of a domain adaptive model 142 in the target domain 120 based on differences between the prediction outputs 232 and the pseudo labels 240 for the mixed data samples 212. For example, the accuracy assessment sub-system 250 determines an accuracy level of the domain adaptive model 142-1 based on differences between the pseudo labels $\{y_{mix,i}^1\}_{i=1}^n$ and the prediction results 232-1 $\{\hat{y}_{mix,i}^1\}_{i=1}^n$ generated by this domain adaptive model 142-1 for the mixed data samples 212. An accuracy level of the domain adaptive model 142 determined according to the embodiments of the present disclosure may be referred to as a PseudoMix metric or score. The higher the differences are, the lower the determined accuracy level is. The accuracy level may be determined based on an aggregation of the differences between all the pseudo labels and the prediction results.

As for the determined mixed data samples and labels, the prediction inference and accuracy computation may be repeated for all candidate domain adaptive models 142 to obtain their accuracy levels. For each of the domain adaptive models 142, the accuracy levels may also be determined in a similar way.

In some embodiments, an example algorithm for model validation according to some embodiments of the present disclosure may be represented in following Table 2. In this example, it is assumed that the target training dataset comprises target images.

TABLE 2

```
# x: a batch of target images with shuffled order
# lam: the mixup coefficient, a given scalar
# net: a trained UDA model with the eval mode
# C: the number of categories
def pseudo_mix_accuracy(x, lam, net, C):
    # batch size
    N = x.shape[0]
    # fix an order for mixup for all models
    b_index = torch.arange(N).flip([0])
    inputs_a = x
    inputs_b = x[b_index]
    # obtain pseudo labels (pl)
    pred_a = net(inputs_a)
    pl_a = F.one_hot(pred_a.max(dim=1) [1], num_classes=C)
    pl_b = pl_a[b_index]
    # images mix and the pseudo label mix
    mix_inputs = lam * inputs_a + (1 − lam) * inputs_b
    mix_labels = lam * pl_a + (1 − lam) * pl_b
    # obtain model predictions for mixed images
    pred_mix = net(mix_inputs)
    pred_labels = pred_mix.max(dim=1) [1]
    # compute the pseudo accuracy for mixed images
    gt_labels = mix_labels.max(dim=1) [1]
    mix_acc = torch.sum(pred_labels == gt_labels) / N
    return mix_acc
```

In some embodiments, the accuracy levels of the domain adaptive models 142 may be used to select a target domain adaptive model 142 for use and/or to select a target value of the hyperparameter(s) for the UDA method adopted for training the domain adaptive models 142. In some embodiments, the domain adaptive model 142 with the highest accuracy level or an accuracy level exceeding a threshold may be selected for use. In some embodiments, a target value of the hyperparameter(s) corresponding to the domain adaptive model 142 with the highest accuracy level or an accuracy level exceeding a threshold may be selected for the UDA method.

In some embodiments, the model selection may be equivalent to the hyperparameter selection. The two descriptions are identical since model selection is at the implementation level, and hyperparameter selection is the goal or result. In some embodiments, the selected target value of the hyperparameter(s) may be further used for guiding following model tuning/updates, and/or other model training procedures.

Although PseudoMix of the present disclosure is unlike all previous methods due to the novel usage of synthesized target samples for model validation, PseudoMix considers similar inductive biases like Entropy and SND. First, the mixed data samples can be seen as neighborhood samples of the corresponding data samples in the target domain. The mixed data samples are expected to be classified into the same category as the main data sample (the data sample with a higher weight) in mixup, which shares the same spirit of the neighborhood consistency in SND. On the other hand, when the mixup weight λ is close to 0.5, the mixed data samples will lie between two target clusters though still slightly biased to one side. In such a strict case, a high PseudoMix score means that the domain adaptive model can tolerate a high variance from the main data sample in mixup and keeps the prediction unchanged. This denotes the classifier boundary of the model is in a low-density region or the classifier margin is high, which is similar to the effect of entropy minimization and can prove high accuracy of the model.

It would be appreciated that although validation for more than one domain adaptive models are illustrated and discussed above, in some embodiments, PseudoMix of the present disclosure may be applied for validating only one domain adaptive model, to simply determine its performance after the training.

Figure 3:
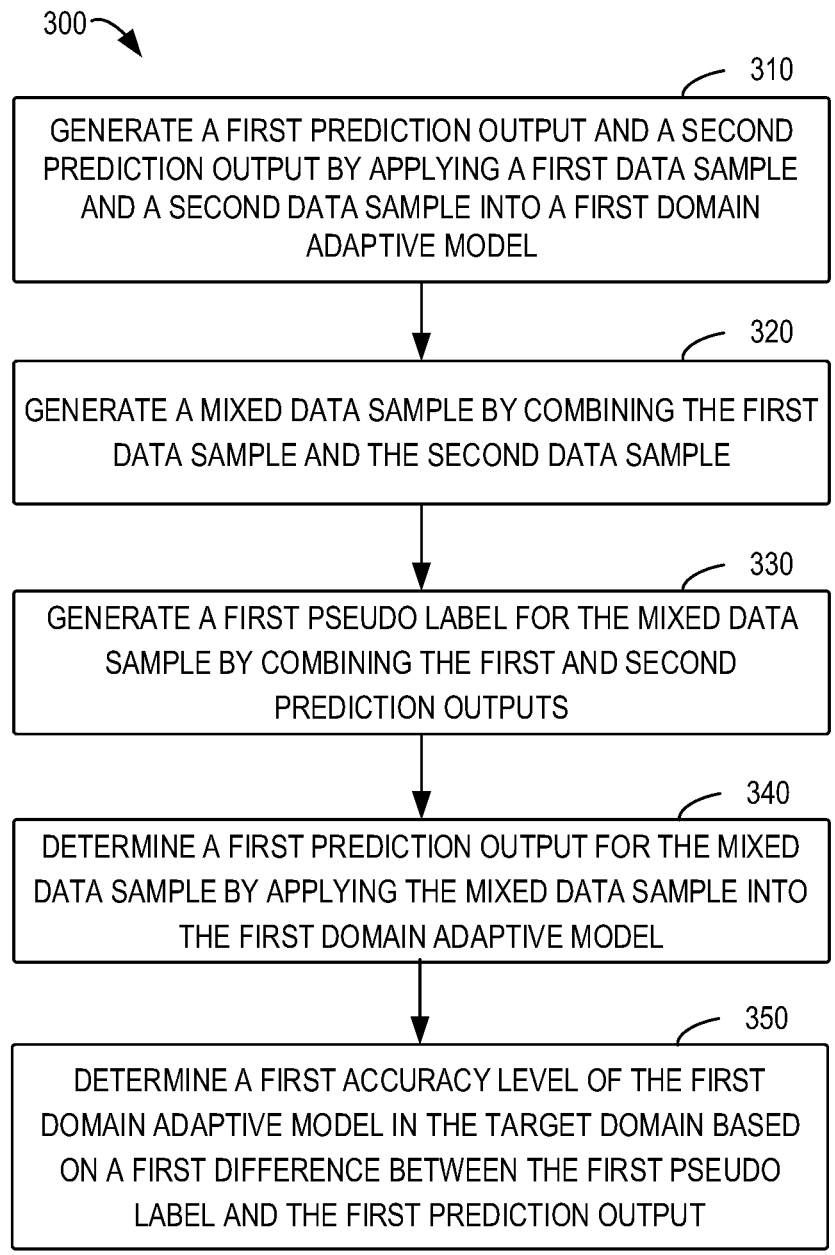
FIG. 3 illustrates a flowchart of a process for model validation in accordance with some example embodiments of the present disclosure.

FIG. 3 illustrates a flowchart of a process 300 for model validation in accordance with some example embodiments of the present disclosure. The process 300 may be implemented at the model validation system 150 as illustrated in FIG. 2.

At block 310, the model validation system 150 generates a first prediction output and a second prediction output by applying a first data sample and a second data sample into a first domain adaptive model, respectively, the first domain adaptive model being trained with a source training dataset in a source domain and a target training dataset in a target domain, the first and second data samples being selected from the target training dataset.

At block 320, the model validation system 150 generates a mixed data sample by combining the first data sample and the second data sample.

At block 330, the model validation system 150 generates a first pseudo label for the mixed data sample by combining the first and second prediction outputs.

At block 340, the model validation system 150 determines a first prediction output for the mixed data sample by applying the mixed data sample into the first domain adaptive model.

At block 350, the model validation system 150 determines a first accuracy level of the first domain adaptive model in the target domain based on a first difference between the first pseudo label and the first prediction output.

In some embodiments, the source training dataset comprises data samples and respective labels for the data samples. In some embodiments, the target training dataset comprises data samples without labels.

In some embodiments, the process 300 further comprises: obtaining a third prediction output and a fourth prediction output by applying a third data sample and a fourth data sample from the target training dataset into a second domain adaptive model, the second domain adaptive model being trained with the source training dataset and the target training dataset; generating a second pseudo label for the mixed data sample by combining the third and fourth prediction outputs; determining a second prediction output for the mixed data sample by applying the mixed data sample into the second domain adaptive model; and determining a second accuracy level of the second domain adaptive model in the target domain based on a second difference between the second pseudo label and the second prediction output.

In some embodiments, the first domain adaptive model is trained according to unsupervised domain adaptation using a first value of a hyperparameter, and the second domain adaptive model is trained according to the unsupervised domain adaptation using a second value of the hyperparameter. In some embodiments, the process 300 further comprises: comparing the first accuracy level with the second accuracy level, selecting, from the first and second values and based on a result of the comparing, a target value of the hyperparameter for the unsupervised domain adaptation.

In some embodiments, generating the mixed data sample comprises: combining the first data sample with a first weight and the second data sample with a second weight. In some embodiments, the process 300 further comprises: generating the first pseudo label comprises: combining the first prediction output with the first weight and the second prediction output with the second weight.

In some embodiments, the first weight or the second weight is set to close to 0.5.

Figure 4:
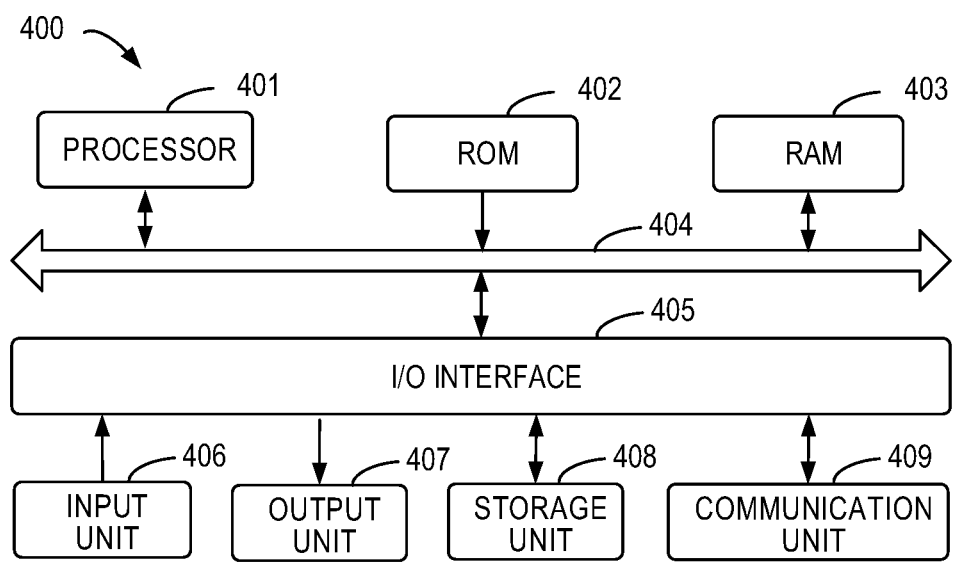
FIG. 4 illustrates a block diagram of an example computing system/device suitable for implementing example embodiments of the present disclosure.

FIG. 4 illustrates a block diagram of an example computing system/device 400 suitable for implementing example embodiments of the present disclosure. The model training system 130 in FIG. 1 and/or the model validation system 150 in FIG. 1 or FIG. 2 may be implemented as or included in the system/device 400. In some embodiments, the data mixup sub-system 210 or the accuracy assessment sub-system 250 may be implemented as or included in the system/device 400.

The system/device 400 may be a general-purpose computer, a physical computing device, or a portable electronic device, or may be practiced in distributed cloud computing environments where tasks are performed by remote processing devices that are linked through a communication network. The system/device 400 can be used to implement any of the processes described herein.

As depicted, the system/device 400 includes a processor 401 which is capable of performing various processes according to a program stored in a read only memory (ROM) 402 or a program loaded from a storage unit 408 to a random-access memory (RAM) 403. In the RAM 403, data required when the processor 401 performs the various processes or the like is also stored as required. The processor 401, the ROM 402 and the RAM 403 are connected to one another via a bus 404. An input/output (I/O) interface 405 is also connected to the bus 404.

The processor 401 may be of any type suitable to the local technical network and may include one or more of the following: general purpose computers, special purpose computers, microprocessors, digital signal processors (DSPs), graphic processing unit (GPU), co-processors, and processors based on multicore processor architecture, as non-limiting examples. The system/device 400 may have multiple processors, such as an application-specific integrated circuit chip that is slaved in time to a clock which synchronizes the main processor.

A plurality of components in the system/device 400 are connected to the I/O interface 405, including an input unit 406, such as a keyboard, a mouse, or the like; an output unit 407 including a display such as a cathode ray tube (CRT), a liquid crystal display (LCD), or the like, and a loudspeaker or the like; the storage unit 408, such as disk and optical disk, and the like; and a communication unit 409, such as a network card, a modem, a wireless transceiver, or the like. The communication unit 409 allows the system/device 400 to exchange information/data with other devices via a communication network, such as the Internet, various telecommunication networks, and/or the like.

The methods and processes described above, such as the process 700, can also be performed by the processor 401. In some embodiments, the process 700 can be implemented as a computer software program or a computer program product tangibly included in the computer readable medium, e.g., storage unit 408. In some embodiments, the computer program can be partially or fully loaded and/or embodied to the system/device 400 via ROM 402 and/or communication unit 409. The computer program includes computer executable instructions that are executed by the associated processor 401. When the computer program is loaded to RAM 403 and executed by the processor 401, one or more acts of the process 700 described above can be implemented. Alternatively, processor 401 can be configured via any other suitable manners (e.g., by means of firmware) to execute the process 700 in other embodiments.

In some example embodiments of the present disclosure, there is provided a computer program product comprising instructions which, when executed by a processor of an apparatus, cause the apparatus to perform steps of any one of the methods described above.

In some example embodiments of the present disclosure, there is provided a computer readable medium comprising program instructions for causing an apparatus to perform at least steps of any one of the methods described above. The computer readable medium may be a non-transitory computer readable medium in some embodiments.

In an eighth aspect, example embodiments of the present disclosure provide a computer readable medium comprising program instructions for causing an apparatus to perform at least the method in the second aspect described above. The computer readable medium may be a non-transitory computer readable medium in some embodiments.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representations, it will be appreciated that the blocks, apparatuses, systems, techniques, or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods/processes as described above. Generally, program modules include routines, programs, libraries, objects, classes, components, data structures, or the like that perform particular tasks or implement particular abstract types. The functionality of the program modules may be combined or split between program modules as desired in various embodiments. Computer-executable instructions for program modules may be executed within a local or distributed device. In a distributed device, program modules may be located in both local and remote storage media.

The computer readable medium may be a computer readable signal medium or a computer readable storage medium. A computer readable medium may include but is not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods disclosed herein may be written in any combination of one or more programming languages. The program code may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

While operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:
   generating a first prediction output and a second prediction output by applying a first data sample and a second data sample into a first domain adaptive model, respectively, the first domain adaptive model being trained with a source training dataset in a source domain and a target training dataset in a target domain, the first and second data samples being selected from the target training dataset;
   generating a mixed data sample by combining the first data sample and the second data sample;
   generating a first pseudo label for the mixed data sample by combining the first and second prediction outputs;
   determining a first prediction output for the mixed data sample by applying the mixed data sample into the first domain adaptive model; and
   determining a first accuracy level of the first domain adaptive model in the target domain based on a first difference between the first pseudo label and the first prediction output.

2. The method of claim 1, wherein the source training dataset comprises data samples and respective labels for the data samples, and
   wherein the target training dataset comprises data samples without labels.

3. The method of claim 1, further comprising:
   obtaining a third prediction output and a fourth prediction output by applying a third data sample and a fourth data sample from the target training dataset into a second domain adaptive model, respectively, the second domain adaptive model being trained with the source training dataset and the target training dataset;
   generating a second pseudo label for the mixed data sample by combining the third and fourth prediction outputs;
   determining a second prediction output for the mixed data sample by applying the mixed data sample into the second domain adaptive model; and
   determining a second accuracy level of the second domain adaptive model in the target domain based on a second difference between the second pseudo label and the second prediction output.

4. The method of claim 3, wherein the first domain adaptive model is trained according to unsupervised domain adaptation using a first value of a hyperparameter, and the second domain adaptive model is trained according to the unsupervised domain adaptation using a second value of the hyperparameter, and
   wherein the method further comprises:
   comparing the first accuracy level with the second accuracy level, and
   selecting, from the first and second values and based on a result of the comparing, a target value of the hyperparameter for the unsupervised domain adaptation.

5. The method of claim 1, wherein generating the mixed data sample comprises:
   combining the first data sample with a first weight and the second data sample with a second weight; and
   wherein generating the first pseudo label comprises:
   combining the first prediction output with the first weight and the second prediction output with the second weight.

6. The method of claim 5, wherein the first weight or the second weight is set to close to 0.5.

7. A system, comprising:
   at least one processor; and
   at least one memory communicatively coupled to the at least one processor and comprising computer-readable instructions that upon execution by the at least one processor cause the at least one processor to perform acts comprising:
   generating a first prediction output and a second prediction output by applying a first data sample and a second data sample into a first domain adaptive model, respectively, the first domain adaptive model being trained with a source training dataset in a source domain and a target training dataset in a target domain, the first and second data samples being selected from the target training dataset;

generating a mixed data sample by combining the first data sample and the second data sample;

generating a first pseudo label for the mixed data sample by combining the first and second prediction outputs;

determining a first prediction output for the mixed data sample by applying the mixed data sample into the first domain adaptive model; and determining a first accuracy level of the first domain adaptive model in the target domain based on a first difference between the first pseudo label and the first prediction output.

8. The system of claim 7, wherein the source training dataset comprises data samples and respective labels for the data samples, and wherein the target training dataset comprises data samples without labels.

9. The system of claim 7, wherein the acts further comprise:

obtaining a third prediction output and a fourth prediction output by applying a third data sample and a fourth data sample from the target training dataset into a second domain adaptive model, respectively, the second domain adaptive model being trained with the source training dataset and the target training dataset;

generating a second pseudo label for the mixed data sample by combining the third and fourth prediction outputs;

determining a second prediction output for the mixed data sample by applying the mixed data sample into the second domain adaptive model; and determining a second accuracy level of the second domain adaptive model in the target domain based on a second difference between the second pseudo label and the second prediction output.

10. The system of claim 9, wherein the first domain adaptive model is trained according to unsupervised domain adaptation using a first value of a hyperparameter, and the second domain adaptive model is trained according to the unsupervised domain adaptation using a second value of the hyperparameter, and wherein the acts further comprise:

comparing the first accuracy level with the second accuracy level, and selecting, from the first and second values and based on a result of the comparing, a target value of the hyperparameter for the unsupervised domain adaptation.

11. The system of claim 9, wherein generating the mixed data sample comprises:

combining the first data sample with a first weight and the second data sample with a second weight; and wherein generating the first pseudo label comprises:

combining the first prediction output with the first weight and the second prediction output with the second weight.

12. The system of claim 11, wherein the first weight or the second weight is set to close to 0.5.

13. A non-transitory computer-readable storage medium, storing computer-readable instructions that upon execution by a computing device cause the computing device to perform acts comprising:

generating a first prediction output and a second prediction output by applying a first data sample and a second data sample into a first domain adaptive model, respectively, the first domain adaptive model being trained with a source training dataset in a source domain and a target training dataset in a target domain, the first and second data samples being selected from the target training dataset;

generating a mixed data sample by combining the first data sample and the second data sample;

generating a first pseudo label for the mixed data sample by combining the first and second prediction outputs;

determining a first prediction output for the mixed data sample by applying the mixed data sample into the first domain adaptive model; and determining a first accuracy level of the first domain adaptive model in the target domain based on a first difference between the first pseudo label and the first prediction output.

14. The computer-readable storage medium of claim 13, wherein the source training dataset comprises data samples and respective labels for the data samples, and wherein the target training dataset comprises data samples without labels.

15. The computer-readable storage medium of claim 13, wherein the acts further comprise:

obtaining a third prediction output and a fourth prediction output by applying a third data sample and a fourth data sample from the target training dataset into a second domain adaptive model, respectively, the second domain adaptive model being trained with the source training dataset and the target training dataset;

generating a second pseudo label for the mixed data sample by combining the third and fourth prediction outputs;

determining a second prediction output for the mixed data sample by applying the mixed data sample into the second domain adaptive model; and determining a second accuracy level of the second domain adaptive model in the target domain based on a second difference between the second pseudo label and the second prediction output.

16. The computer-readable storage medium of claim 15, wherein the first domain adaptive model is trained according to unsupervised domain adaptation using a first value of a hyperparameter, and the second domain adaptive model is trained according to the unsupervised domain adaptation using a second value of the hyperparameter, and wherein the acts further comprise:

comparing the first accuracy level with the second accuracy level, and selecting, from the first and second values and based on a result of the comparing, a target value of the hyperparameter for the unsupervised domain adaptation.

17. The computer-readable storage medium of claim 13, wherein generating the mixed data sample comprises:

combining the first data sample with a first weight and the second data sample with a second weight; and wherein generating the first pseudo label comprises:

combining the first prediction output with the first weight and the second prediction output with the second weight.

18. The computer-readable storage medium of claim 17, wherein the first weight or the second weight is set to close to 0.5.

* * * * *